United States Patent
Jiang et al.

(10) Patent No.: US 12,206,323 B2
(45) Date of Patent: Jan. 21, 2025

(54) BRIDGELESS POWER FACTOR CORRECTION PFC CIRCUIT

(71) Applicant: Huawei Digital Power Technologies Co., Ltd., Shenzhen (CN)

(72) Inventors: Hua Jiang, Shenzhen (CN); Zejie Lv, Dongguan (CN); Baoguo Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 256 days.

(21) Appl. No.: 17/994,635

(22) Filed: Nov. 28, 2022

(65) Prior Publication Data

US 2023/0089905 A1    Mar. 23, 2023

Related U.S. Application Data

(63) Continuation of application No. PCT/CN2020/093368, filed on May 29, 2020.

(51) Int. Cl.
*H02M 1/42*    (2007.01)
*H02M 1/00*    (2006.01)
*H02M 1/44*    (2007.01)

(52) U.S. Cl.
CPC ....... *H02M 1/4225* (2013.01); *H02M 1/0009* (2021.05); *H02M 1/0058* (2021.05); *H02M 1/44* (2013.01)

(58) Field of Classification Search
CPC ............. H02M 1/4225; H02M 1/0009; H02M 1/0058; H02M 1/44
See application file for complete search history.

(56) References Cited

U.S. PATENT DOCUMENTS

| | | | |
|---|---|---|---|
| 6,952,777 B1 * | 10/2005 | Post | G07B 17/00733 710/10 |
| 2011/0074467 A1 * | 3/2011 | Tang | H03F 1/0216 327/96 |
| 2019/0238124 A1 * | 8/2019 | Tajima | G01K 3/14 |
| 2019/0312507 A1 | 10/2019 | Kamath et al. | |

FOREIGN PATENT DOCUMENTS

| | | |
|---|---|---|
| CN | 104237615 A | 12/2014 |
| CN | 109067212 A | 12/2018 |
| WO | 2011063685 A1 | 6/2011 |
| WO | 2017206684 A1 | 12/2017 |

* cited by examiner

*Primary Examiner* — Adolf D Berhane
*Assistant Examiner* — Afework S Demisse
(74) *Attorney, Agent, or Firm* — Maier & Maier, PLLC

(57) ABSTRACT

A bridgeless PFC circuit includes: a control module that collects a current flowing through a current sampling element; and when the current flowing through the current sampling element is greater than a first threshold, the control module controls a switch element to be turned on. Based on the current flowing through the current sampling element, the switch element can be controlled to be turned on, thereby implementing zero-voltage turn-on of the switch element. Because the collected current does not change abruptly, a delay requirement on a sampling control circuit included in the control module is lowered, and a signal anti-interference capability of the control module is strong.

20 Claims, 13 Drawing Sheets

BRIDGELESS POWER FACTOR CORRECTION PFC CIRCUIT

CROSS-REFERENCE TO RELATED APPLICATIONS

This application is a continuation of International Application No. PCT/CN2020/093368, filed on May 29, 2020, the disclosure of which is hereby incorporated by reference in its entirety.

TECHNICAL FIELD

The embodiments relate to the circuit field, and a bridgeless power factor correction (PFC) circuit.

BACKGROUND

Currently, developing a green, energy-saving, and highly-efficient power supply becomes an inevitable trend. A bridgeless PFC circuit becomes a mainstream technology in the industry due to its high efficiency and high power density.

In a bridgeless boost PFC circuit, a switching transistor with small on resistance may be used to replace a low-frequency rectifier diode. Therefore, the bridgeless boost PFC circuit is more suitable for a scenario with high efficiency and a high power density. When an alternating current power supply works in different cycles, a PFC circuit needs to correspondingly control different switch elements to be turned on or turned off, to implement a rectification function of the PFC circuit. A voltage of a switch element may be detected to generate a first control signal, an alternating current input voltage may be detected to generate a second control signal, and the first control signal and the second control signal may be combined to form a final control signal and to control the switch element to be turned on or turned off, thereby implementing zero-voltage turn-on of the switch element.

However, the voltage of the switch element changes violently, a requirement for a sampling control circuit is high, and a signal anti-interference capability of the sampling control circuit is weak.

SUMMARY

The embodiments may provide a bridgeless PFC circuit, in which a control module collects a current flowing through a current sampling element. When the current flowing through the current sampling element is greater than a first threshold, the control module controls a switch element to be turned on. In this way, based on the current flowing through the current sampling element, the switch element can be controlled to be turned on, thereby implementing zero-voltage turn-on of the switch element. Because the collected current does not change abruptly, a delay requirement on a sampling control circuit included in the control module is lowered, and a signal anti-interference capability of the control module is strong.

According to a first aspect, a PFC circuit may be provided. The circuit includes an alternating current power supply, a low-frequency switch module, a power module, and a control module. The low-frequency switch module includes a switch element, the power module includes a first inductor, and the control module includes a current sampling element. The alternating current power supply is connected to the low-frequency switch module by using the switch element, the alternating current power supply is connected to the power module by using the first inductor, the low-frequency switch module is connected to the power module by using the switch element, the control module is connected to the power module by using the current sampling element and/or the control module is connected to the low-frequency switch module by using the current sampling element, and the control module controls the switch element included in the low-frequency switch module to be turned on or turned off. The control module collects a current flowing through the current sampling element. When the current flowing through the current sampling element is greater than a first threshold, the control module controls the switch element to be turned on or turned off.

In the bridgeless PFC circuit provided in this embodiment, the control module may collect the current flowing through the current sampling element. When the current flowing through the current sampling element is greater than the first threshold, the control module controls the switch element to be turned on. In this way, based on the current flowing through the current sampling element, the switch element can be controlled to be turned on, thereby implementing zero-voltage turn-on of the switch element. Because the collected current does not change abruptly, a delay requirement on a sampling control circuit included in the control module is lowered, and a signal anti-interference capability of the control module is strong.

In a possible implementation of the first aspect, in the circuit, the switch element includes a first low-frequency switch and a second low-frequency switch, the power module further includes a first power switch, a second power switch, and a first capacitor, and the current sampling element includes a first sampling element. A first terminal of the alternating current power supply is connected to a first terminal of the first inductor, and a second terminal of the alternating current power supply is connected to a first terminal of the first low-frequency switch and a first terminal of the second low-frequency switch. A second terminal of the first inductor is connected to a first terminal of the first power switch and a first terminal of the second power switch. A second terminal of the first low-frequency switch is connected to a second terminal of the first power switch. A second terminal of the second low-frequency switch is connected to a second terminal of the second power switch. The first capacitor is connected in parallel to a bridge arm branch including the first power switch and the second power switch. An input terminal of the control module is connected to the first sampling element, and an output terminal of the control module is connected to a third terminal of the first low-frequency switch and a third terminal of the second low-frequency switch. When the alternating current power supply is in different output states, the first sampling element is located in different locations.

In this possible implementation, an optional circuit topology is provided. When the alternating current power supply is in different output states, the first sampling element may be connected to different branches. In this way, the control module can collect currents of different branches by using the first sampling element, to control a low-frequency switch element based on the currents of the different branches.

In a possible implementation of the first aspect, in the circuit, when the alternating current power supply works in a positive half-cycle and the first power switch is in an on state, the first sampling element is connected in series to a branch in which the first power switch is located. When a current flowing through the first sampling element is greater than the first threshold, the control module controls the first low-frequency switch to be turned on.

In this possible implementation, when the alternating current power supply works in the positive half-cycle and the first power switch is in the on state, the first sampling element is connected in series to the branch in which the first power switch is located, and further, the control module can control the first low-frequency switch based on the current flowing through the first power switch.

In a possible implementation of the first aspect, in the circuit, when the alternating current power supply works in a positive half-cycle and the first power switch is in an off state, the first sampling element is connected in series to a branch in which the second power switch is located. When a current flowing through the first sampling element is greater than the first threshold, the control module controls the first low-frequency switch to be turned on.

In this possible implementation, when the alternating current power supply works in the positive half-cycle and the first power switch is in the off state, the first sampling element is connected in series to the branch in which the second power switch is located, and further, the control module can control the first low-frequency switch based on the current flowing through the second power switch.

In a possible implementation of the first aspect, in the circuit, when the alternating current power supply works in a negative half-cycle and the second power switch is in an on state, the first sampling element is connected in series to a branch in which the second power switch is located. When a current flowing through the first sampling element is greater than the first threshold, the control module controls the second low-frequency switch to be turned on.

In this possible implementation, when the alternating current power supply works in the negative half-cycle and the second power switch is in the on state, the first sampling element is connected in series to the branch in which the second power switch is located, and further, the control module can control the second low-frequency switch based on the current flowing through the second power switch.

In a possible implementation of the first aspect, in the circuit, when the alternating current power supply works in a negative half-cycle and the second power switch is in an off state, the first sampling element is connected in series to a branch in which the first power switch is located. When a current flowing through the first sampling element is greater than the first threshold, the control module controls the second low-frequency switch to be turned on.

In this possible implementation, when the alternating current power supply works in the negative half-cycle and the second power switch is in the off state, the first sampling element is connected in series to the branch in which the first power switch is located, and further, the control module can control the second low-frequency switch based on the current flowing through the first power switch.

In a possible implementation of the first aspect, in the circuit, the current sampling element further includes a second sampling element. When the alternating current power supply works in a positive half-cycle, the first sampling element is connected in series to a branch in which the first power switch is located, and the second sampling element is connected in series to a branch in which the second power switch is located. When a sum of a current flowing through the first sampling element and a current flowing through the second sampling element is greater than the first threshold, the control module controls the first low-frequency switch to be turned on.

In this possible implementation, the control module can control the first low-frequency switch based on the sum of the current flowing through the first sampling element and the current flowing through the second sampling element.

In a possible implementation of the first aspect, in the circuit, the current sampling element further includes a second sampling element. When the alternating current power supply works in a negative half-cycle, the first sampling element is connected in series to a branch in which the first power switch is located, and the second sampling element is connected in series to a branch in which the second power switch is located. When a sum of a current flowing through the first sampling element and a current flowing through the second sampling element is greater than the first threshold, the control module controls the second low-frequency switch to be turned on.

In this possible implementation, the control module can control the second low-frequency switch based on the sum of the current flowing through the first sampling element and the current flowing through the second sampling element.

In a possible implementation of the first aspect, in the circuit, the low-frequency switch module further includes a first diode and a second diode. A negative electrode of the first diode is connected to the first terminal of the alternating current power supply and a positive electrode of the second diode, and a positive electrode of the first diode is connected to the second terminal of the first low-frequency switch and the second terminal of the first power switch. The positive electrode of the second diode is connected to the first terminal of the alternating current power supply, and a negative electrode of the second diode is connected to the second terminal of the second low-frequency switch and the second terminal of the second power switch. The control module collects a current of a third sampling element, and the current flowing through the third sampling element is a current flowing through the first diode or the second diode. When the current flowing through the third sampling element is greater than a second threshold, the control module controls the first low-frequency switch or the second low-frequency switch to be turned off.

In this possible implementation, the low-frequency switch module includes the first diode and the second diode. When the current in the first diode or the second diode exceeds the first threshold, the control module may turn off a low-frequency switch to protect the low-frequency switch. In this way, reliability of the PFC circuit is improved.

In a possible implementation of the first aspect, in the circuit, when the alternating current power supply works in a positive half-cycle and the first low-frequency switch is in an on state, the third sampling element is connected in series to a branch in which the first diode is located or the third sampling element is connected in series to a branch between the first terminal of the alternating current power supply and a first connection point, and the first connection point is a connection point between the first diode and the second diode. When the current flowing through the third sampling element is greater than the first threshold, the control module controls the first low-frequency switch to be turned off.

In this possible implementation, the third sampling element is connected in series to the branch in which the first diode is located or the third sampling element is connected in series to the branch between the first terminal of the alternating current power supply and the first connection point. The control module collects the current flowing through the first diode, and when the control module determines that the current in the third sampling element is greater than the first threshold, the control module may turn off the first low-frequency switch to protect the first low-frequency switch.

In a possible implementation of the first aspect, in the circuit, when the alternating current power supply works in a negative half-cycle and the second low-frequency switch is in an on state, the third sampling element is connected in series to a branch in which the second diode is located or the third sampling element is connected to a branch between the first terminal of the alternating current power supply and a first connection point, and the first connection point is a connection point between the first diode and the second diode. When the current flowing through the third sampling element is greater than the first threshold, the control module controls the second low-frequency switch to be turned off, thereby improving reliability of the PFC circuit.

In this possible implementation, the third sampling element is connected in series to the branch in which the second diode is located or the third sampling element is connected to the branch between the first terminal of the alternating current power supply and the first connection point. The control module collects the current flowing through the second diode, and when the control module determines that the current in the third sampling element is greater than the first threshold, the control module may turn off the second low-frequency switch to protect the second low-frequency switch, thereby improving reliability of the PFC circuit.

In a possible implementation of the first aspect, in the circuit, when the alternating current power supply works in a positive half-cycle and the first low-frequency switch is in an on state, the third sampling element is connected in series between a second connection point and a third connection point, the second connection point is a connection point between the first diode and the first power switch, the third connection point is a connection point between the first low-frequency switch and the first capacitor, and the third sampling element is the same as the first sampling element. When the current flowing through the third sampling element is greater than the first threshold, the control module controls the first low-frequency switch to be turned off.

In this possible implementation, the third sampling element is connected in series between the second connection point and the third connection point, and the control module may collect the current flowing through the first diode. When the control module determines that the current in the third sampling element is greater than the first threshold, the control module may turn off the first low-frequency switch, thereby improving reliability of the PFC circuit.

In a possible implementation of the first aspect, in the circuit, when the alternating current power supply works in a negative half-cycle and the second low-frequency switch is in an on state, the third sampling element is connected in series between a fourth connection point and a fifth connection point, the fourth connection point is a connection point between the second diode and the second power switch, the fifth connection point is a connection point between the second low-frequency switch and the first capacitor, and the third sampling element is the same as the first sampling element. When the current flowing through the third sampling element is greater than the first threshold, the control module controls the second low-frequency switch to be turned off.

In this possible implementation, the third sampling element is connected in series between the fourth connection point and the fifth connection point, and the control module may collect the current flowing through the second diode. When the control module determines that the current in the third sampling element is greater than the first threshold, the control module may turn off the second low-frequency switch, thereby improving reliability of the PFC circuit.

In a possible implementation of the first aspect, in the circuit, the power module further includes a second inductor, a third power switch, and a fourth power switch. A first terminal of the second inductor is connected to the first terminal of the alternating current power supply, and a second terminal of the second inductor is connected to a first terminal of the third power switch. The first capacitor is connected in parallel to a bridge arm branch including the third power switch and the fourth power switch. A second terminal of the third power switch is connected to the second terminal of the first power switch. A first terminal of the fourth power switch is connected to the first terminal of the second power switch, and a second terminal of the fourth power switch is connected to the first terminal of the third power switch.

In this possible implementation, the PFC circuit includes a plurality of groups of boost circuits, which can improve rectification efficiency of the PFC circuit.

In a possible implementation of the first aspect, in the circuit, the current sampling element further includes a second sampling element. When the alternating current power supply works in a positive half-cycle, the first sampling element is connected in series to a branch in which the first power switch is located and the second sampling element is connected in series to a branch in which the third power switch is located, or the first sampling element is connected in series to a branch in which the second power switch is located and the second sampling element is connected in series to a branch in which the fourth power switch is located. When a sum of a current flowing through the first sampling element and a current flowing through the second sampling element is greater than the first threshold, the control module controls the first low-frequency switch to be turned on.

In this possible implementation, the first sampling element is connected in series to the branch in which the first power switch is located and the second sampling element is connected in series to the branch in which the third power switch is located, or the first sampling element is connected in series to the branch in which the second power switch is located and the second sampling element is connected in series to the branch in which the fourth power switch is located. The control module may control, by collecting the sum of the current of the first power switch and the current of the third power switch or collecting the sum of the current of the second power switch and the current of the fourth power switch, the first low-frequency switch to be turned on.

In a possible implementation of the first aspect, in the circuit, the current sampling element further includes a second sampling element. When the alternating current power supply works in a negative half-cycle, the first sampling element is connected in series to a branch in which the second power switch is located and the second sampling element is connected in series to a branch in which the fourth power switch is located, or the first sampling element is connected in series to a branch in which the first power switch is located and the second sampling element is connected in series to a branch in which the third power switch is located. When a sum of a current flowing through the first sampling element and a current flowing through the second sampling element is greater than the first threshold, the control module controls the second low-frequency switch to be turned on.

In this possible implementation, the first sampling element is connected in series to the branch in which the second power switch is located and the second sampling element is connected in series to the branch in which the fourth power switch is located, or the first sampling element is connected in series to the branch in which the first power switch is located and the second sampling element is connected in series to the branch in which the third power switch is located. The control module may control, by collecting the sum of the current of the second power switch and the current of the fourth power switch or collecting the sum of the current of the first power switch and the current of the third power switch, the second low-frequency switch to be turned on.

In a possible implementation of the first aspect, in the circuit, the current sampling element further includes a second sampling element, a fourth sampling element, and a fifth sampling element. When the alternating current power supply works in a positive half-cycle, the first sampling element is connected in series to a branch in which the first power switch is located, the second sampling element is connected in series to a branch in which the second power switch is located, the fourth sampling element is connected in series to a branch in which the third power switch is located, and the fifth sampling element is connected in series to a branch in which the fourth power switch is located. When a sum of a current flowing through the first sampling element, a current flowing through the second sampling element, a current flowing through the fourth sampling element, and a current flowing through the fifth sampling element is greater than the first threshold, the control module controls the first low-frequency switch to be turned on.

In this possible implementation, the control module may collect the sum of the current flowing through the first power switch, the current flowing through the second power switch, the current flowing through the third power switch, and the current flowing through the fourth power switch, to control the first low-frequency switch to be turned on.

In a possible implementation of the first aspect, in the circuit, the current sampling element further includes a second sampling element, a fourth sampling element, and a fifth sampling element. When the alternating current power supply works in a negative half-cycle, the first sampling element is connected in series to a branch in which the first power switch is located, the second sampling element is connected in series to a branch in which the second power switch is located, the fourth sampling element is connected in series to a branch in which the third power switch is located, and the fifth sampling element is connected in series to a branch in which the fourth power switch is located. When a sum of a current flowing through the first sampling element, a current flowing through the second sampling element, a current flowing through the fourth sampling element, and a current flowing through the fifth sampling element is greater than the first threshold, the control module controls the second low-frequency switch to be turned on.

In this possible implementation, the control module may collect the sum of the current flowing through the first power switch, the current flowing through the second power switch, the current flowing through the third power switch, and the current flowing through the fourth power switch, to control the second low-frequency switch to be turned on.

In a possible implementation of the first aspect, the control module further includes a controller. The controller includes a discrete element, or the controller includes a logic device.

In a possible implementation of the first aspect, the logic device includes a complex programmable logic device (CPLD), a microcontroller unit (MCU), a field programmable gate array (FPGA), a central processing unit (CPU), or a digital signal processor (DSP).

In a possible implementation of the first aspect, the power module may work in a critical conduction mode (CRM), a continuous current mode (CCM), a triangular current mode (TCM), or a discontinuous current mode (DCM).

In a possible implementation of the first aspect, the switch element includes an insulated gate bipolar transistor (IGBT), a metal-oxide-semiconductor field-effect transistor (MOS-FET), or gallium nitride (GaN FET).

In a possible implementation of the first aspect, the current sampling element is a resistor or a current transformer for computed tomography (CT).

According to a second aspect, a communication power supply may be provided. The communication power supply includes the PFC circuit. The PFC circuit includes an alternating current power supply, a low-frequency switch module, a power module, and a control module. The PFC circuit is the PFC circuit described in the first aspect or any possible implementation of the first aspect.

DETAILED DESCRIPTION OF THE EMBODIMENTS

The following describes the embodiments with reference to the accompanying drawings. It is clear that the described embodiments are merely a part rather than all of the embodiments. All other embodiments obtained by a person skilled in the art based on the embodiments herein shall fall within the scope of the embodiments herein.

In the embodiments, and accompanying drawings, the terms "first", "second", "third", "fourth", and so on (if existent) are intended to distinguish between similar objects but do not necessarily indicate an order or sequence. It should be understood that the data termed in such a way are interchangeable in proper circumstances so that embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units but may include other steps or units not expressly listed or inherent to such a process, method, product, or device.

Currently, developing a green, energy-saving, and highly-efficient power supply becomes an inevitable trend. A bridgeless PFC circuit becomes a mainstream technology in the industry due to its high efficiency and high power density.

Optionally, the bridgeless PFC circuit may be used in a communication power supply, a boost rectifier, or another electronic device. This is not limited herein.

Figure 1:
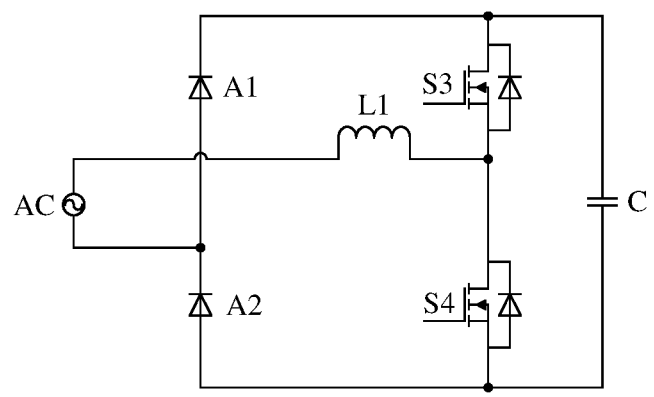
FIG. 1 is a diagram of a basic topology of a bridgeless PFC circuit according to an embodiment.

FIG. 1 is a diagram of a basic topology of a bridgeless PFC circuit according to an embodiment.

FIG. 1 shows the basic topology of the bridgeless PFC circuit. The basic topology of the bridgeless PFC circuit includes an alternating current power supply, two rectifier diodes A1 and A2 that are connected in series, two switch elements S3 and S4 that are connected in series, an inductor L1, and a capacitor C. The switch elements S3 and S4 that are connected in series may be metal-oxide-semiconductor field-effect transistors (MOSFET).

Optionally, the bridgeless PFC circuit may work by using a single bridge arm, two bridge arms with a 180-degree phase difference, or three bridge arms with a 120-degree phase difference. This is not limited herein.

For example, a working principle of the bridgeless PFC circuit is described by using an example in which the bridgeless PFC circuit works by using a single bridge arm. If the switch elements S3 and S4 are MOSFETs, when a current output by the alternating current power supply is in a positive half-cycle, it is considered that the alternating current power supply works in a positive half-cycle. In this case, the MOSFET S4 serves as a main transistor and the MOSFET S3 serves as a synchronous transistor. Within an on time Ton of the MOSFET S4, a current loop may flow through the inductor L1, the MOSFET S4, and a diode D2. In this case, the inductor L1 stores energy. Within an off time Toff of the MOSFET S4, a current loop flows through the inductor L1, the MOSFET S3, the capacitor C, and the diode A2. In this case, the inductor L1 outputs energy. The alternating current power supply and the inductor L1 provide energy to the capacitor C. Similarly, when a current output by the alternating current power supply is in a negative half-cycle, it is considered that the alternating current power supply works in a negative half-cycle. The MOSFET S3 serves as a main transistor and the MOSFET S4 serves as a synchronous transistor. Within an on time Ton of the MOSFET S3, a current loop flows through the inductor L1, the MOSFET S3, and the diode A1. In this case, the inductor L1 stores energy. Within an off time Toff of the MOSFET S3, a current loop flows through the inductor L1, the MOSFET S4, the capacitor C, and a diode D1. In this case, the alternating current power supply and the inductor L1 provide energy to the capacitor C.

In this embodiment, the bridgeless PFC circuit may work in a CRM mode, a TCM mode, a CCM mode, and a DCM mode. Alternatively, the bridgeless PFC circuit may work in another mode. This is not limited herein. The following briefly describes characteristics of each working mode.

When the bridgeless PFC circuit works in the CRM mode, a reverse recovery current of a body diode of a synchronous transistor flows through a body diode of a main transistor, to implement zero-voltage turn-on of the main transistor. When the bridgeless PFC circuit works in the TCM mode, a negative current of a synchronous transistor is sampled and controlled to flow through a body diode of a main transistor, to implement zero-voltage turn-on of the main transistor. When the bridgeless PFC circuit works in the CCM mode, if a switching transistor is a GaN transistor, no reverse recovery problem exists. The GaN transistor may be directly used in the bridgeless PFC circuit. If the switch element is an IGBT or a MOSFET, in an example of a MOSFET, the MOSFET switch element is usually connected in series to a diode that has a polarity opposite to that of a body diode of the MOSFET switch element, and then the MOSFET switch element is connected in parallel to a diode whose positive electrode and negative electrode are respectively connected to a source of the MOSFET and a cathode of the diode connected in series. The diode connected in parallel is usually a silicon carbide SiC diode, a GaN diode, or a fast recovery diode. In this way, the reverse recovery problem in the CCM mode can be resolved. The DCM mode is not described in detail herein again.

Figure 2:
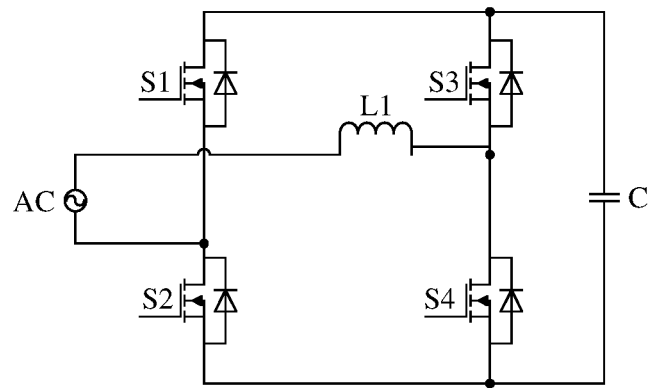
FIG. 2 is a diagram of a basic topology of another bridgeless PFC circuit according to an embodiment.

FIG. 2 is a diagram of a basic topology of another bridgeless PFC circuit according to an embodiment.

As shown in FIG. 2, to further improve a power density and efficiency of the bridgeless PFC circuit, the rectifier diodes A1 and A2 shown in FIG. 1 are usually replaced with switch elements S1 and S2 shown in FIG. 2.

When the alternating current power supply works in different cycles, the PFC circuit needs to correspondingly control S1 and S2 to be turned on or turned off, to implement a rectification function of the PFC circuit. A voltage of a switch element may be detected to generate a first control signal, an alternating current input voltage may be detected to generate a second control signal, and the first control signal and the second control signal may be combined to form a final control signal and to control the switch element to be turned on or turned off.

However, the voltage of the switch element changes violently, a delay requirement on a sampling control circuit used for sampling the voltage of the switch element is low, and a signal anti-interference capability of the sampling control circuit is weak.

For the foregoing problems existing in control of an existing bridgeless PFC circuit, an embodiment may provide a bridgeless PFC circuit, in which a control module collects a current flowing through a current sampling element. When the current flowing through the current sampling element is greater than a first threshold, the control module controls a switch element to be turned on. In this way, based on the current flowing through the current sampling element, the switch element can be controlled to be turned on, thereby implementing zero-voltage turn-on of the switch element. Because the collected current does not change abruptly, a delay requirement on a sampling control circuit included in the control module is lowered, and a signal anti-interference capability of the control module is strong.

Figure 3:
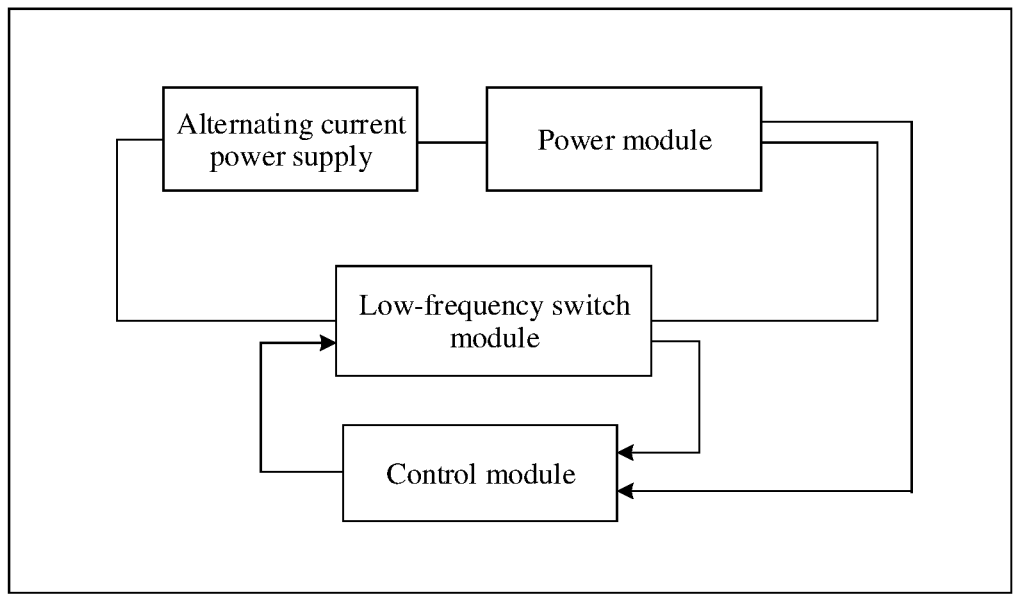
FIG. 3 is a schematic diagram of a structure of a bridgeless PFC circuit according to an embodiment.

FIG. 3 is a schematic diagram of a structure of a bridgeless PFC circuit according to an embodiment.

As shown in FIG. 3, the bridgeless PFC circuit includes an alternating current power supply, a low-frequency switch module, a power module, and a control module. The low-frequency switch module includes a switch element, the power module includes a first inductor, and the control module includes a current sampling element. The bridgeless PFC circuit may further include another module. This is not limited herein.

In this embodiment, there may be a connection relationship between the modules included in the bridgeless PFC circuit. The alternating current power supply is connected to the low-frequency switch module by using the switch element, the alternating current power supply is connected to the power module by using the first inductor, the low-frequency switch module is connected to the power module by using the switch element, the control module is connected to the power module by using the current sampling element and/or the control module is connected to the low-frequency switch module by using the current sampling element, and the control module controls the switch element included in the low-frequency switch module to be turned on or turned off.

In this embodiment, the control module may collect a current flowing through the current sampling element. In this way, when the current flowing through the current sampling element is greater than a first threshold, the control module can control the switch element to be turned on. Therefore, the control module can control the switch element based on the current flowing through the sampling element.

Based on the schematic diagram of the structure of the bridgeless PFC circuit illustrated in FIG. 3, the following describes the bridgeless PFC circuit provided in this embodiment.

Figure 4:
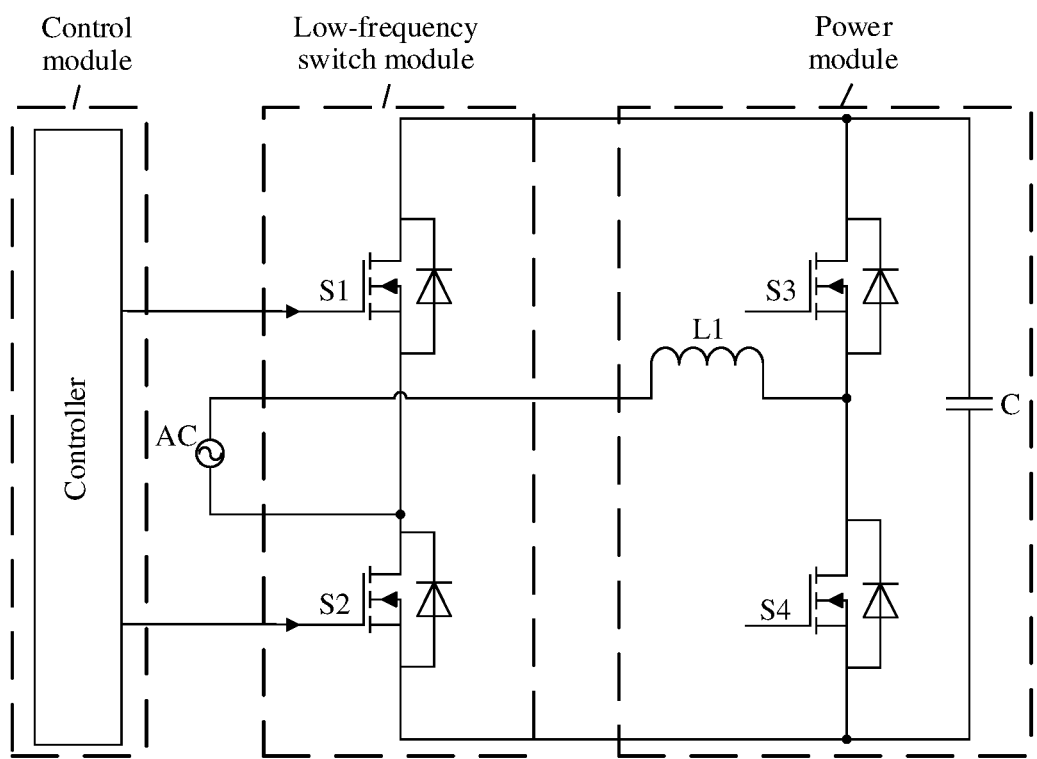
FIG. 4 is a schematic diagram of an embodiment of a bridgeless PFC circuit according.

FIG. 4 is a schematic diagram of an embodiment of the bridgeless PFC circuit according to an embodiment.

In this embodiment, a possible implementation is shown in FIG. 4. The switch element included in the bridgeless PFC circuit may include a first low-frequency switch and a second low-frequency switch and may further include another low-frequency switch. This is not limited herein. The power module included in the bridgeless PFC circuit further includes a first power switch, a second power switch, and a first capacitor. The current sampling element includes a first sampling element and may further include another element. This is not limited herein.

In this embodiment, as shown in FIG. 4, a first terminal of the alternating current power supply is connected to a first terminal of the first inductor, and a second terminal of the alternating current power supply is connected to a first terminal of the first low-frequency switch and a first terminal of the second low-frequency switch. A second terminal of the first inductor is connected to a first terminal of the first power switch and a first terminal of the second power switch. A second terminal of the first low-frequency switch is connected to a second terminal of the first power switch. A second terminal of the second low-frequency switch is connected to a second terminal of the second power switch. The first capacitor is connected in parallel to a bridge arm branch including the first power switch and the second power switch. An input terminal of the control module is connected to the first sampling element, and an output terminal of the control module is connected to a third terminal of the first low-frequency switch and a third terminal of the second low-frequency switch.

In this embodiment, when the alternating current power supply is in different output states, the first sampling element is in different locations, and the control module may collect currents of different branches, to control, based on the currents of the different branches, the first low-frequency switch and the second low-frequency switch to be turned on.

In this embodiment, the control module may further include a controller. The controller includes a discrete element, or the controller includes a logic device. The control module may further include another device. This is not limited herein.

In this embodiment, the logic device may include a complex CPLD, an MCU, an FPGA, a CPU, or a DSP. The logic device may alternatively be another device. This is not limited herein.

In this embodiment, the power module may work in a critical conduction mode CRM, a continuous current mode CCM, a triangular current mode TCM, or a discontinuous current mode DCM. The power module may alternatively work in another mode. This is not limited herein.

In this embodiment, the switch element may include an IGBT, a MOSFET, or a GaN FET. The switch element may alternatively be another element. This is not limited herein.

In this embodiment, the current sampling element may be a resistor or a CT. The current sampling element may alternatively be another device. This is not limited herein.

Figure 4A:
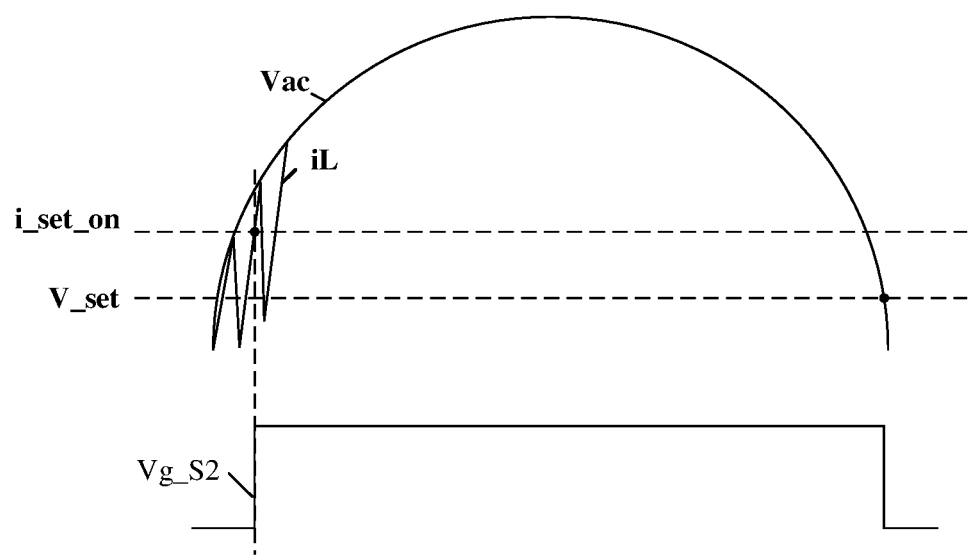
FIG. 4a is a schematic diagram of another embodiment of a bridgeless PFC circuit according.

FIG. 4a shows a driving waveform of the first low-frequency switch S2, a current waveform of the first inductor L1, and a voltage waveform of an alternating current input in a case that the alternating current input is in a positive half-cycle. It can be seen from FIG. 9 that, when a current flowing through the first inductor L1 rises to a preset threshold, the controller turns on the first low-frequency switch S2, and when the positive half-cycle is about to end and an alternating current input voltage is less than a preset value, the controller turns off the first low-frequency switch S2. In this way, zero-voltage turn-on and power-frequency synchronous rectification of the first low-frequency switch S2 are implemented.

Figure 5:
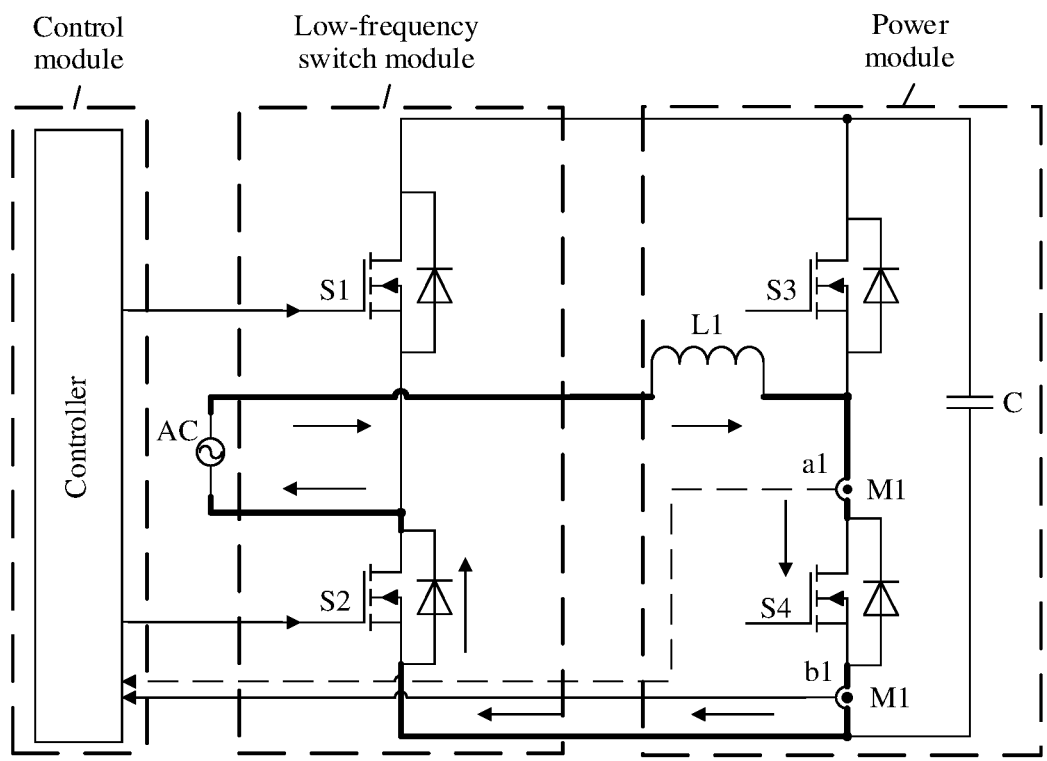
FIG. 5 is a schematic diagram of another embodiment of a bridgeless PFC circuit.

FIG. 5 is a schematic diagram of an embodiment of the bridgeless PFC circuit according to an embodiment.

In this embodiment, a possible implementation is shown in FIG. 5. When the alternating current power supply works in a positive half-cycle and the first power switch is in an on state, the first sampling element is connected in series to a branch in which the first power switch is located. Optionally, the first sampling element may be connected in series from a location a1 to the branch in which the first power switch is located, the first sampling element may be connected in series from a location b1 to the branch in which the first power switch is located, or the first sampling element may be connected in another equivalent manner to the branch in which the first power switch is located. This is not limited herein.

In this embodiment, when the alternating current power supply works in the positive half-cycle and the first power switch is in the on state, a current may flow through the first inductor L1, the first power switch S4, and the first low-frequency switch S2. In this case, the first inductor L1 stores energy. When the controller in the control module determines that a current flowing through the first sampling element M1 is greater than the first threshold, the control module may control the first low-frequency switch S2 to be turned on. In this way, zero-voltage turn-on and power-frequency synchronous rectification of the first low-frequency switch S2 are implemented.

Figure 6:
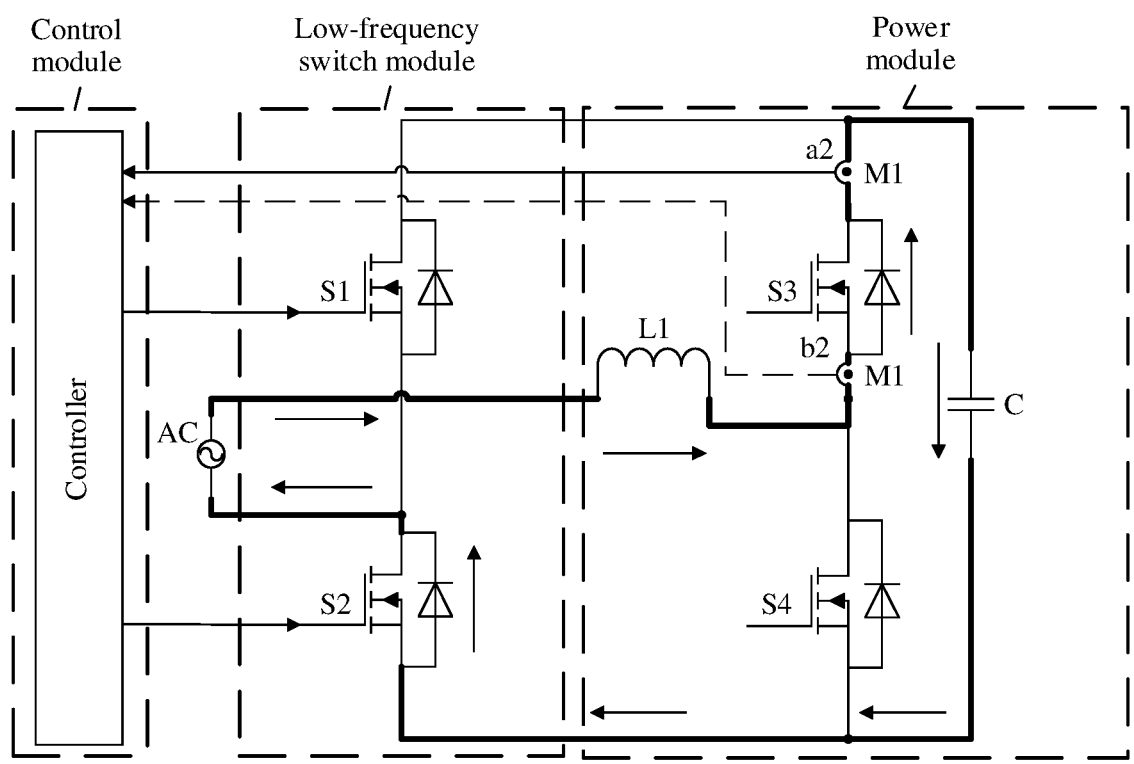
FIG. 6 is a schematic diagram of another embodiment of a bridgeless PFC circuit.

FIG. 6 is a schematic diagram of another embodiment of the bridgeless PFC circuit according to an embodiment.

In this embodiment, a possible implementation is shown in FIG. 6. When the alternating current power supply works in a positive half-cycle and the first power switch is in an off state, the first sampling element is connected in series to a branch in which the second power switch is located. Optionally, the first sampling element M1 may be connected in series from a location a2 to the branch in which the second power switch S3 is located, the first sampling element M1 may be connected in series from a location b2 to the branch in which the second power switch S3 is located, or the first sampling element M1 may be connected in another equivalent manner to the branch in which the second power switch S3 is located. This is not limited herein.

In this embodiment, when the alternating current power supply works in the positive half-cycle and the first power switch S4 is in the off state, a current may flow through the first inductor L1, the second power switch S3, the first capacitor C1, and the first low-frequency switch S2. In this case, the first inductor L1 outputs energy, and the alternating current power supply and the first inductor L1 jointly provide energy to the first capacitor C1. When the controller in the control module determines that a current flowing through the first sampling element M1 is greater than the first threshold, the control module may control the first low-frequency switch S2 to be turned on. In this way, zero-voltage turn-on and power-frequency synchronous rectification of the first low-frequency switch S2 are implemented.

Figure 7:
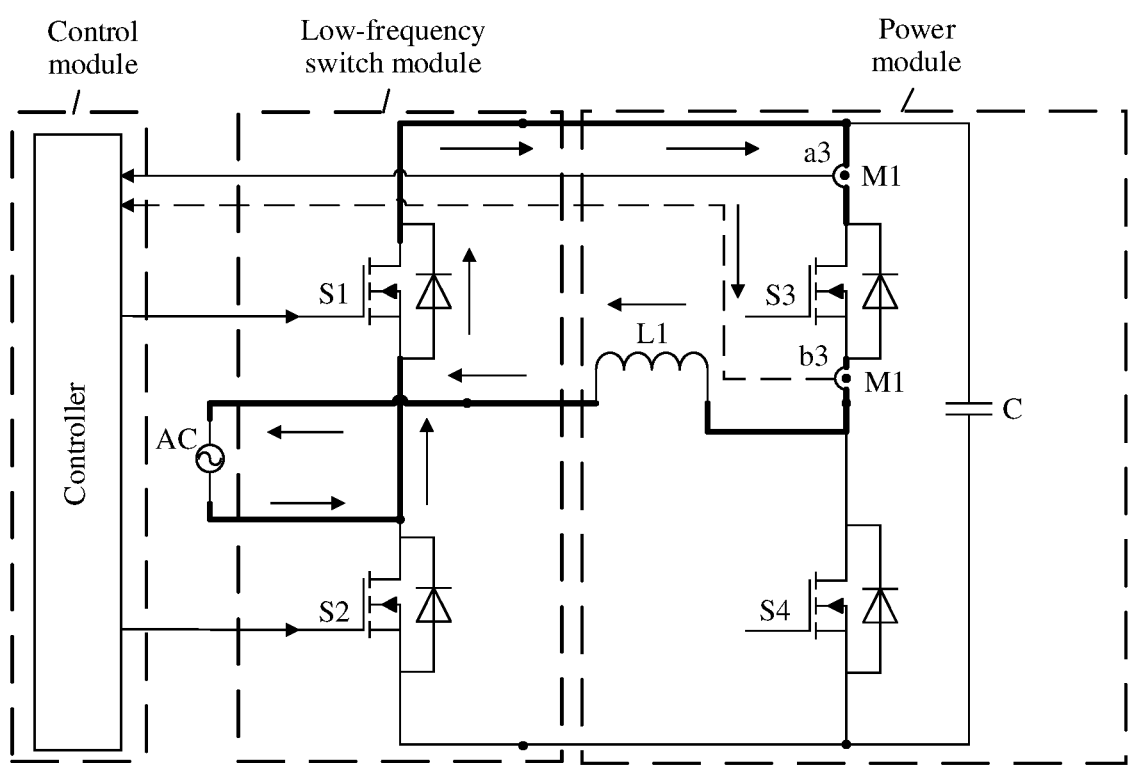
FIG. 7 is a schematic diagram of another embodiment of a bridgeless PFC circuit.

FIG. 7 is a schematic diagram of another embodiment of the bridgeless PFC circuit according to an embodiment.

In this embodiment, a possible implementation is shown in FIG. 7. When the alternating current power supply works in a negative half-cycle and the second power switch S3 is in an on state, the first sampling element M1 is connected in series to a branch in which the second power switch S3 is located. Optionally, the first sampling element M1 may be connected in series from a location a3 to the branch in which the second power switch S3 is located, the first sampling element M1 may be connected in series from a location b3 to the branch in which the second power switch S3 is located, or the first sampling element M1 may be connected in another equivalent manner to the branch in which the second power switch S3 is located. This is not limited herein.

In this embodiment, when the alternating current power supply works in the negative half-cycle and the second power switch S3 is in the on state, a current may flow through the second low-frequency switch S1, the second power switch S3, and the first inductor L1. When the controller in the control module determines that a current flowing through the first sampling element M1 is greater than the first threshold, the control module controls the second low-frequency switch S1 to be turned on. In this way, zero-voltage turn-on and power-frequency synchronous rectification of the second low-frequency switch S1 are implemented.

Figure 8:
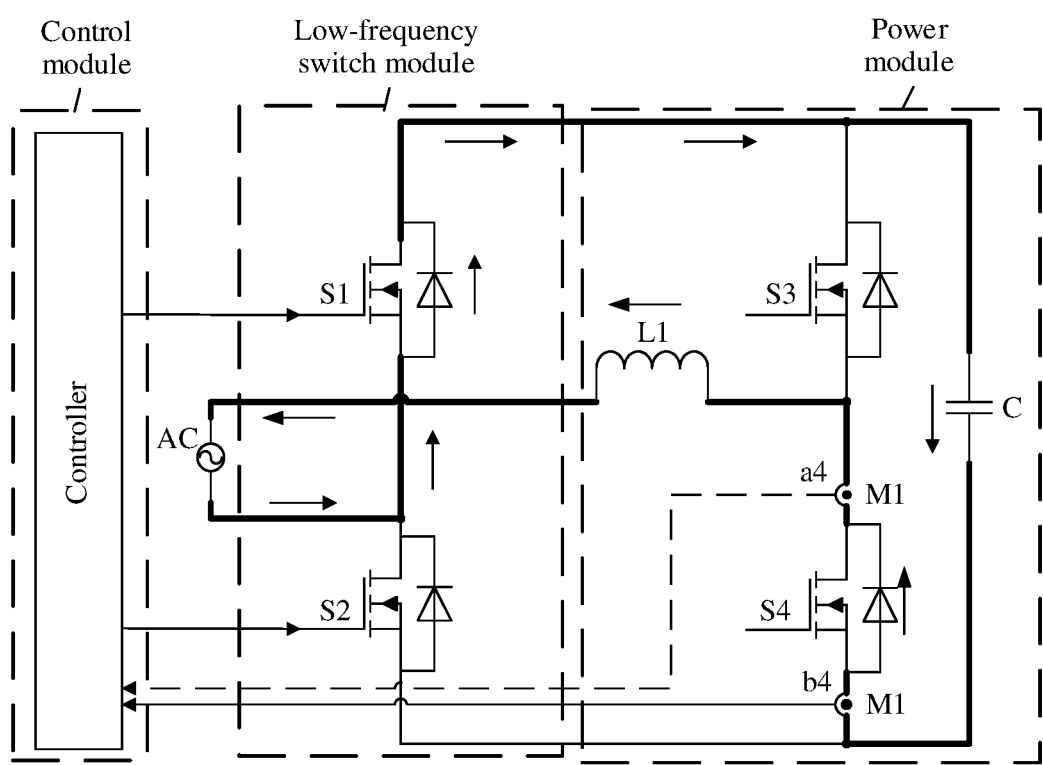
FIG. 8 is a schematic diagram of another embodiment of a bridgeless PFC circuit.

FIG. 8 is a schematic diagram of another embodiment of the bridgeless PFC circuit according to an embodiment.

In this embodiment, a possible implementation is shown in FIG. 8. When the alternating current power supply works in a negative half-cycle and the second power switch S3 is in an off state, the first sampling element M1 is connected in series to a branch in which the first power switch S4 is located. Optionally, the first sampling element M1 may be connected in series from a location a4 to the branch in which the first power switch S4 is located, the first sampling element M1 may be connected in series from a location b4 to the branch in which the first power switch S4 is located, or the first sampling element M1 may be connected in another equivalent manner to the branch in which the first power switch S4 is located. This is not limited herein.

In this embodiment, when the alternating current power supply works in the negative half-cycle and the second power switch S3 is in the off state, a current may flow through the second low-frequency switch S1, the first capacitor C, the first power switch S4, and the first inductor L1. When the controller in the control module determines that a current flowing through the first sampling element M1 is greater than the first threshold, the control module controls the second low-frequency switch S1 to be turned on. In this way, zero-voltage turn-on and power-frequency synchronous rectification of the second low-frequency switch S1 are implemented.

Figure 9:
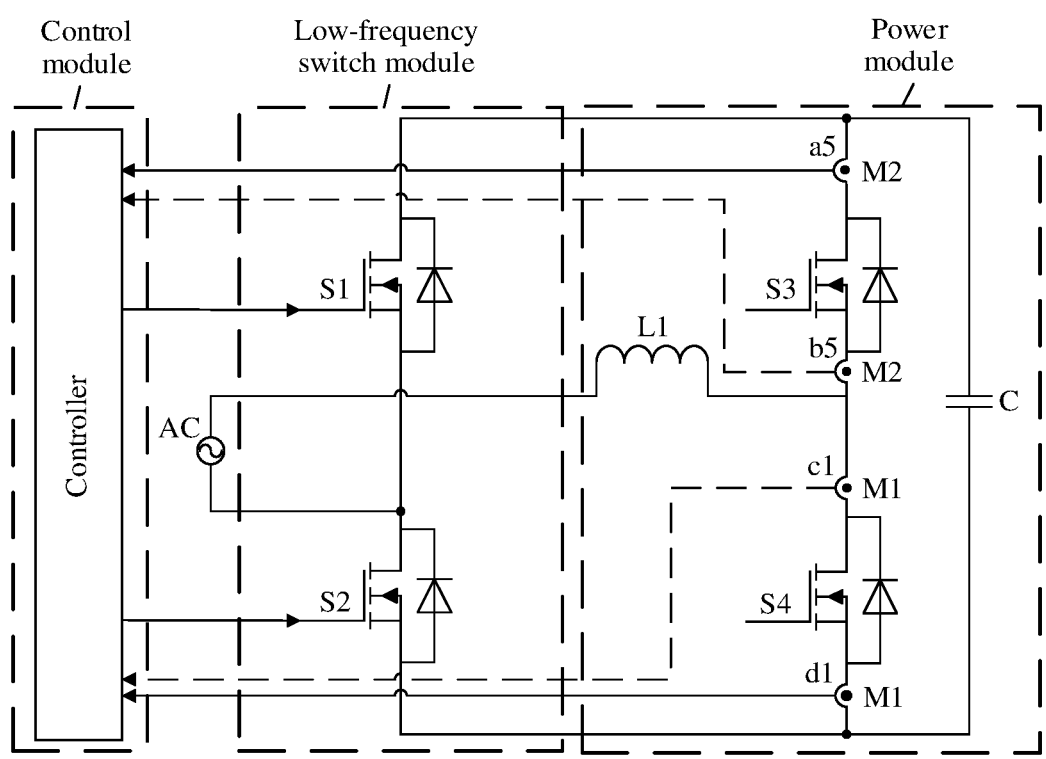
FIG. 9 is a schematic diagram of another embodiment of a bridgeless PFC circuit.

FIG. 9 is a schematic diagram of another embodiment of the bridgeless PFC circuit according to an embodiment.

In this embodiment, a possible implementation is shown in FIG. 9. Optionally, the current sampling element may further include a second sampling element M2.

When the alternating current power supply works in a positive half-cycle, the first sampling element M1 is connected in series to a branch in which the first power switch is located. The first sampling element M1 is connected in series to the branch in which the first power switch S4 is located. Optionally, the first sampling element M1 may be connected in series from a location d1 to the branch in which the first power switch S4 is located, the first sampling element M1 may be connected in series from a location c1 to the branch in which the first power switch S4 is located, or the first sampling element M1 may be connected in another equivalent manner to the branch in which the first power switch S4 is located. This is not limited herein.

The second sampling element M2 is connected in series to a branch in which the second power switch is located. Optionally, the second sampling element M2 is connected in series to the branch in which the second power switch S3 is located. Optionally, the second sampling element M2 may be connected in series from a location a5 to the branch in which the second power switch S3 is located, the second sampling element M2 may be connected in series from a location b5 to the branch in which the second power switch S3 is located, or the second sampling element M2 may be connected in another equivalent manner to the branch in which the second power switch S3 is located. This is not limited herein.

When the controller in the control module determines that a sum of a current flowing through the first sampling element M1 and a current flowing through the second sampling element M2 is greater than the first threshold, the control module controls the first low-frequency switch S2 to be turned on. In this way, zero-voltage turn-on and power-frequency synchronous rectification of the first low-frequency switch S2 are implemented.

When the alternating current power supply works in a negative half-cycle, the first sampling element M1 is connected in series to a branch in which the first power switch is located, and the second sampling element M2 is connected in series to a branch in which the second power switch is located. A serial connection manner may be similar to the manner shown in FIG. 9 in the foregoing embodiment. Details are not described herein again.

When the controller in the control module determines that a sum of a current flowing through the first sampling element M1 and a current flowing through the second sampling element M2 is greater than the first threshold, the control module controls the second low-frequency switch S1 to be turned on. In this way, zero-voltage turn-on and power-frequency synchronous rectification of the second low-frequency switch S1 are implemented.

In a possible implementation, optionally, the low-frequency switch module may further include a first diode D2 and a second diode D1.

In this embodiment, a negative electrode of the first diode D2 is connected to the first terminal of the alternating current power supply and a positive electrode of the second diode D1, and a positive electrode of the first diode D2 is connected to the second terminal of the first low-frequency switch S2 and the second terminal of the first power switch S4. The positive electrode of the second diode D1 is connected to the first terminal of the alternating current power supply, and a negative electrode of the second diode D1 is connected to the second terminal of the second low-frequency switch S1 and the second terminal of the second power switch S3. The control module collects a current of a third sampling element, and the current flowing through the third sampling element is a current flowing through the first diode or the second diode.

When the controller in the control module determines that the current flowing through the third sampling element is greater than the first threshold, the controller in the control module controls the first low-frequency switch or the second low-frequency switch to be turned off.

Figure 9A:
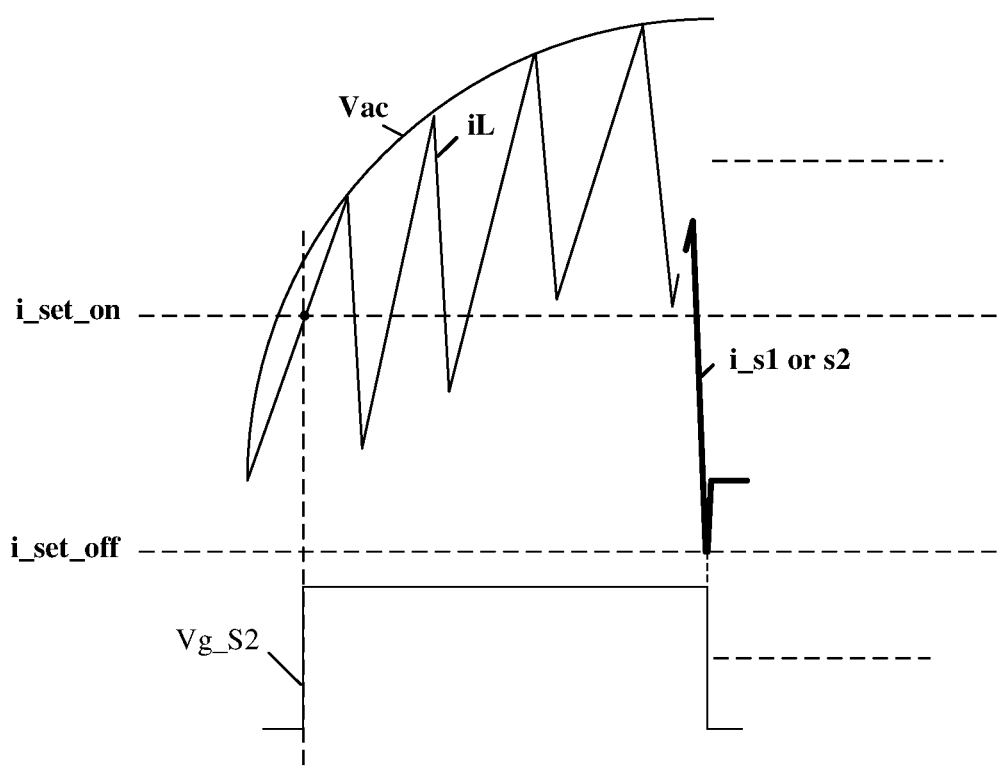
FIG. 9a is a schematic diagram of another embodiment of a bridgeless PFC circuit.

In this embodiment, an example in which the first low-frequency switch S2 is protected is used for description. When a poor working condition, for example, lightning occurs, a reverse current in a channel direction of a low-frequency switch element is excessively large, which is prone to damaging a device. FIG. 9a shows a driving waveform of the first low-frequency switch S2, a current waveform of the first inductor L1, a current waveform of the first low-frequency switch S2, and a voltage waveform of an alternating current input. It can be seen from FIG. 9a that, when a reverse current flowing through the first low-frequency switch S2 rises to a preset value, the controller included in the control module quickly turns off the first low-frequency switch S2. In this way, reverse overcurrent protection of the first low-frequency switch S2 is implemented.

Figure 10:
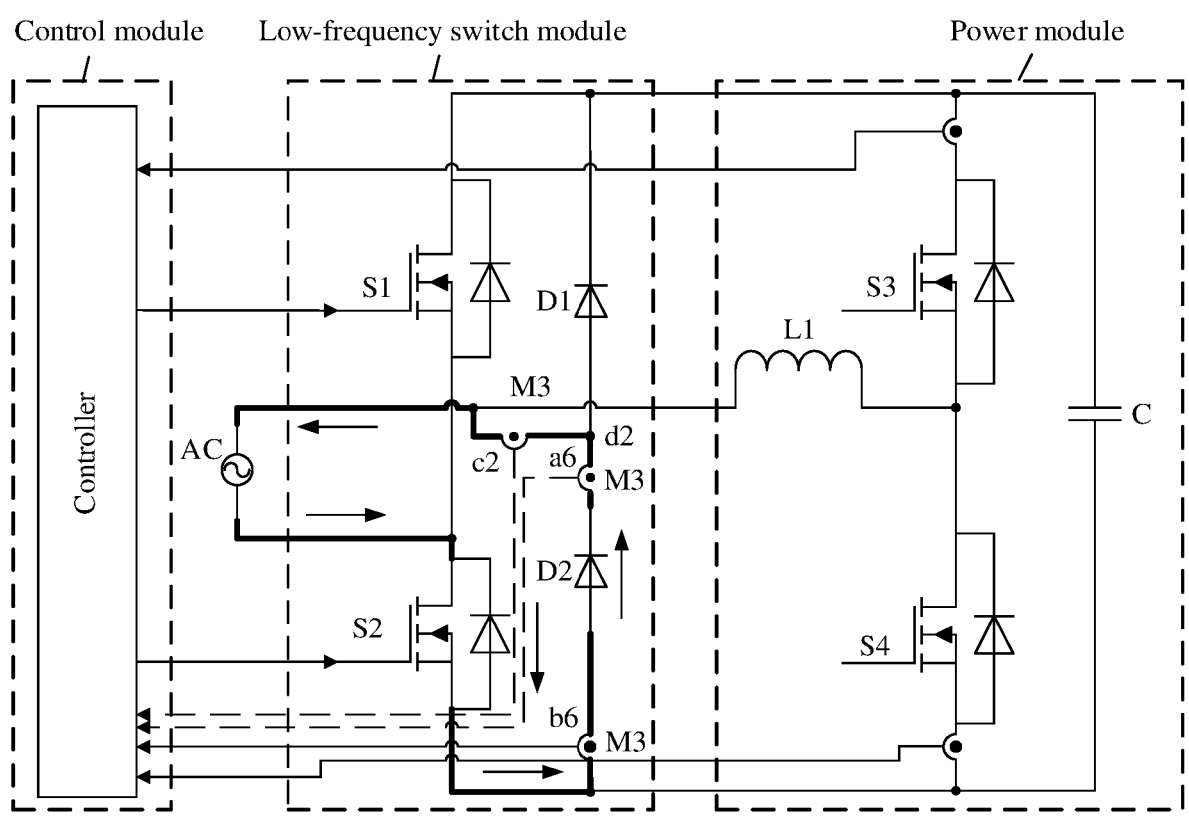
FIG. 10 is a schematic diagram of another embodiment of a bridgeless PFC circuit.

FIG. 10 is a schematic diagram of another embodiment of the bridgeless PFC circuit according to an embodiment.

In this embodiment, a possible implementation is shown in FIG. 10. Optionally, when the alternating current power supply works in a positive half-cycle and the first low-frequency switch S2 is in an on state, the third sampling element M3 is connected in series to a branch in which the first diode D2 is located. Optionally, the third sampling element M3 may be connected in series from a location a6 to the branch in which the first diode D2 is located, the third sampling element M3 may be connected in series from a location b6 to the branch in which the first diode D2 is located, or the third sampling element M3 may be connected in another equivalent manner to the branch in which the first diode D2 is located. This is not limited herein.

Optionally, the third sampling element M3 may alternatively be connected in series from a location c2 shown in the figure to a branch between the first terminal of the alternating current power supply and a first connection point, and the first connection point is a connection point d2 between the first diode and the second diode.

When the controller in the control module determines that a current flowing through the third sampling element M3 is greater than the first threshold, the controller in the control module controls the first low-frequency switch S2 to be turned off.

Figure 11:
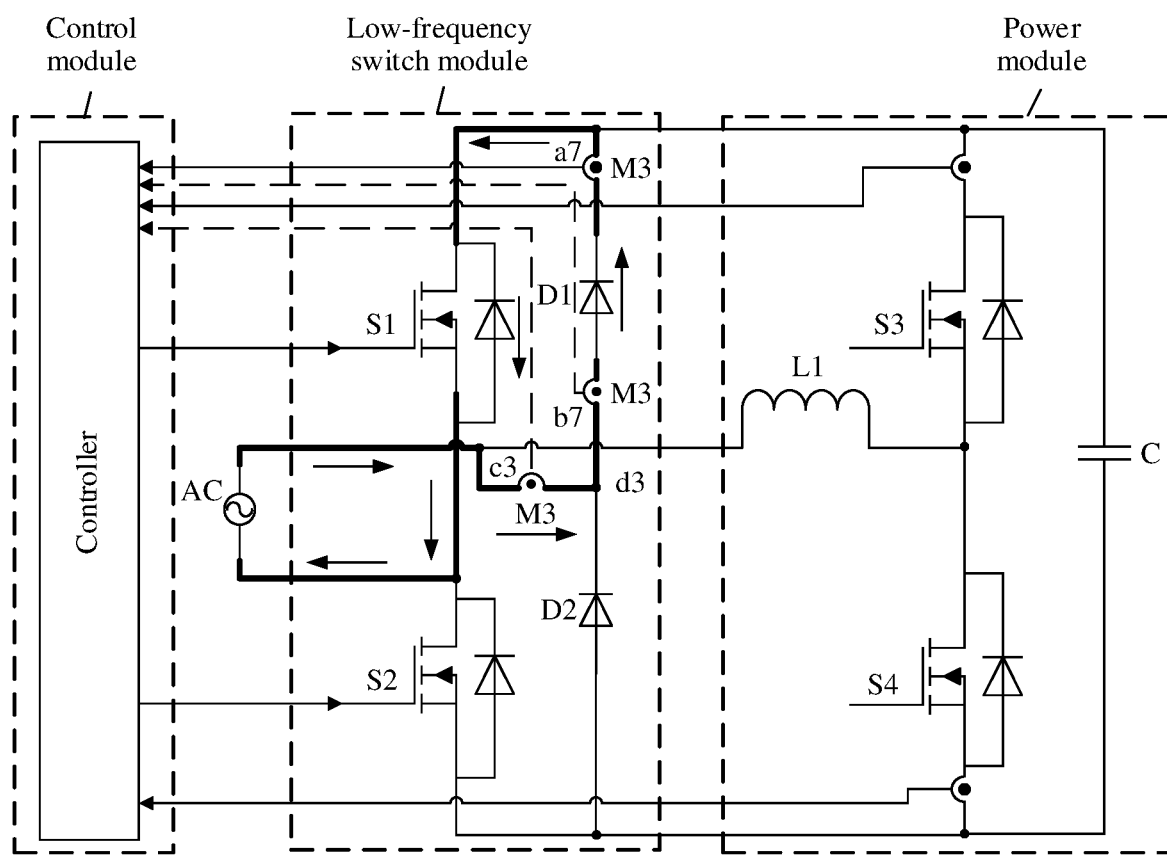
FIG. 11 is a schematic diagram of another embodiment of a bridgeless PFC circuit.

FIG. 11 is a schematic diagram of another embodiment of the bridgeless PFC circuit according to an embodiment.

In this embodiment, a possible implementation is shown in FIG. 11. Optionally, when the alternating current power supply works in a negative half-cycle and the second low-frequency switch S1 is in an on state, the third sampling element M3 is connected in series to a branch in which the second diode D1 is located. Optionally, the third sampling element M3 may be connected in series from a location a7 to the branch in which the second diode D1 is located, the third sampling element M3 may be connected in series from a location b7 to the branch in which the second diode D1 is located, or the third sampling element M3 may be connected in another equivalent manner to the branch in which the second diode D1 is located. This is not limited herein.

Optionally, the third sampling element M3 may alternatively be connected in series from a location c3 shown in the figure to a branch between the first terminal of the alternating current power supply and a first connection point, and the first connection point is a connection point d3 between the first diode and the second diode.

When the controller in the control module determines that a current flowing through the third sampling element M3 is greater than the first threshold, the controller in the control module controls the second low-frequency switch S1 to be turned off.

Figure 12:
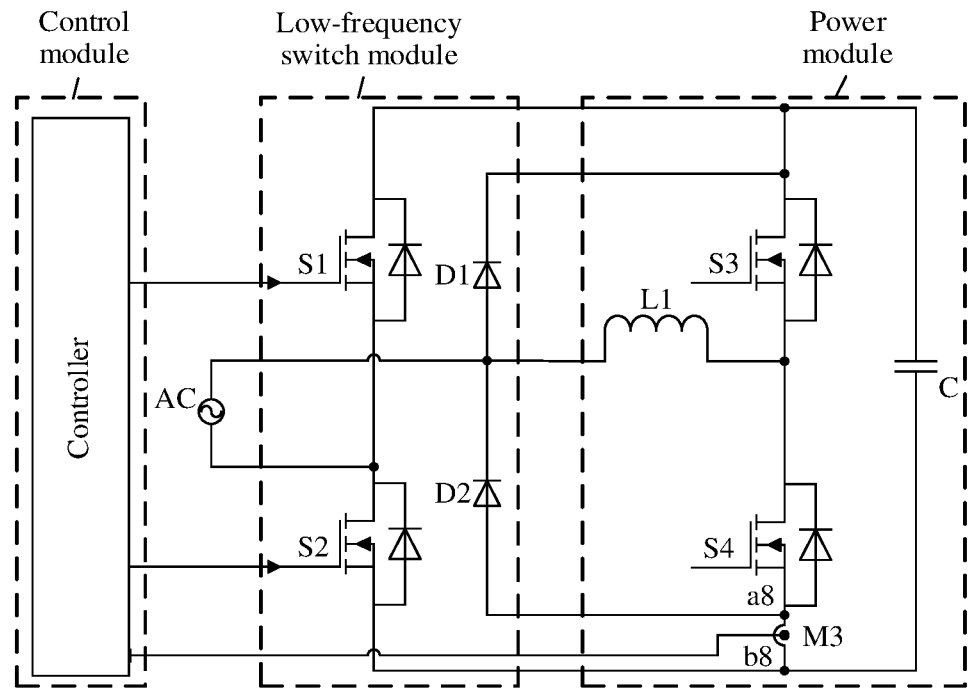
FIG. 12 is a schematic diagram of another embodiment of a bridgeless PFC circuit.

FIG. 12 is a schematic diagram of another embodiment of the bridgeless PFC circuit according to an embodiment.

In this embodiment, a possible implementation is shown in FIG. 12. Optionally, when the alternating current power supply works in a positive half-cycle and the first low-frequency switch S2 is in an on state, the third sampling element M3 is connected in series between a second connection point a8 and a third connection point b8, the second connection point a8 is a connection point between the first diode D2 and the first power switch S4, the third connection point b8 is a connection point between the first low-frequency switch S2 and the first capacitor C, and the third sampling element M3 is the same as the first sampling element M1.

When the controller in the control module determines that a current flowing through the third sampling element M3 is greater than the first threshold, the controller in the control module controls the first low-frequency switch S2 to be turned off.

Figure 13:
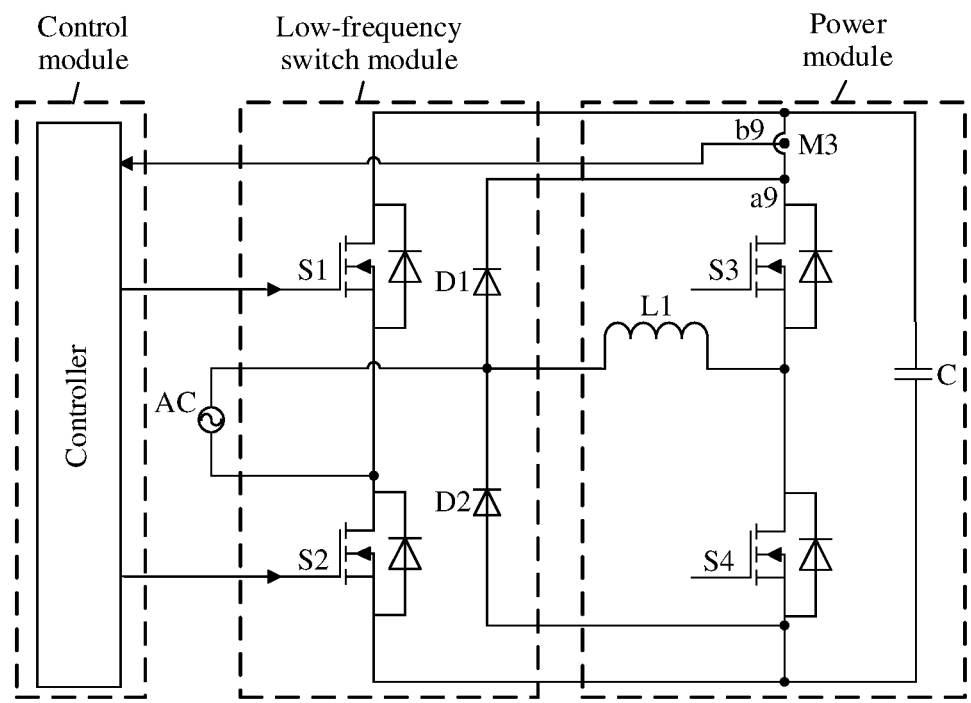
FIG. 13 is a schematic diagram of another embodiment of a bridgeless PFC circuit.

FIG. 13 is a schematic diagram of another embodiment of the bridgeless PFC circuit according to an embodiment.

In this embodiment, a possible implementation is shown in FIG. 13. Optionally, when the alternating current power supply works in a negative half-cycle and the second low-frequency switch S1 is in an on state, the third sampling element M3 is connected in series between a fourth connection point a9 and a fifth connection point b9, the fourth connection point a9 is a connection point between the second diode D1 and the second power switch S3, the fifth connection point b9 is a connection point between the second low-frequency switch S1 and the first capacitor C, and the third sampling element M3 is the same as the first sampling element M1.

When the controller in the control module determines that a current flowing through the third sampling element M3 is greater than the first threshold, the controller in the control module controls the second low-frequency switch S1 to be turned off.

In a possible implementation, optionally, the power module may further include a second inductor L2, a third power switch S6, and a fourth power switch S5.

A first terminal of the second inductor L2 is connected to the first terminal of the alternating current power supply, and a second terminal of the second inductor L2 is connected to a first terminal of the third power switch S6. The first capacitor C is connected in parallel to a bridge arm branch including the third power switch S6 and the fourth power switch S5. A second terminal of the third power switch S6 is connected to the second terminal of the first power switch S4. A first terminal of the fourth power switch S5 is connected to the first terminal of the second power switch S3, and a second terminal of the fourth power switch S5 is connected to the first terminal of the third power switch S6.

Figure 14:
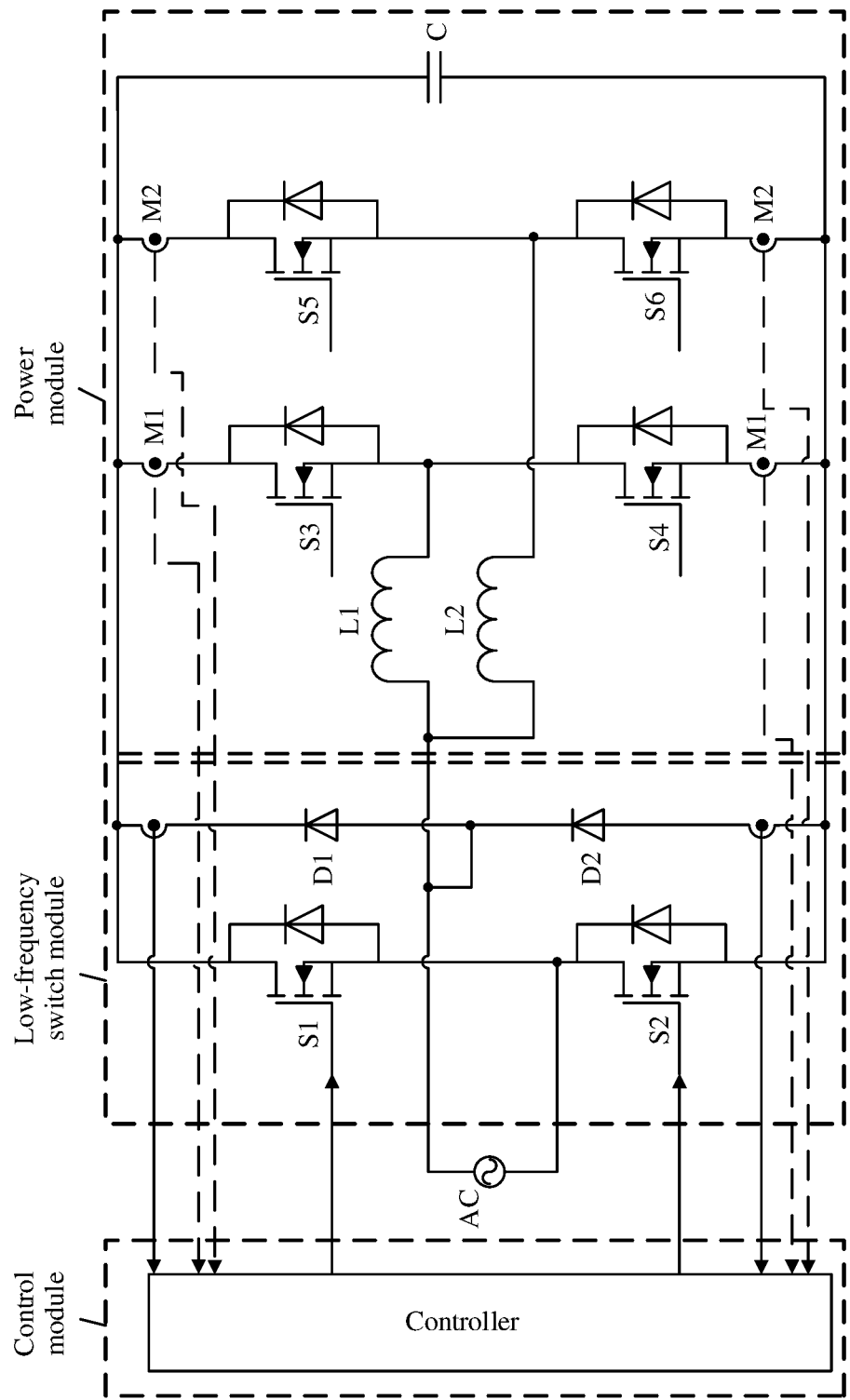
FIG. 14 is a schematic diagram of another embodiment of a bridgeless PFC circuit.

FIG. 14 is a schematic diagram of another embodiment of the bridgeless PFC circuit according to an embodiment.

In this embodiment, a possible implementation is shown in FIG. 14. Optionally, the current sampling element further includes a second sampling element M2.

When the alternating current power supply works in a positive half-cycle, the first sampling element M1 is connected in series to a branch in which the first power switch S4 is located and the second sampling element M2 is connected in series to a branch in which the third power switch S6 is located, or the first sampling element M1 is connected in series to a branch in which the second power switch S3 is located and the second sampling element M2 is connected in series to a branch in which the fourth power switch S5 is located.

When the controller in the control module determines that a sum of a current flowing through the first sampling element M1 and a current flowing through the second sampling element M2 is greater than the first threshold, the controller in the control module controls the first low-frequency switch S2 to be turned on.

When the alternating current power supply works in a negative half-cycle, the first sampling element M1 is connected in series to a branch in which the second power switch S3 is located and the second sampling element M2 is connected in series to a branch in which the fourth power switch S5 is located, or the first sampling element M1 is connected in series to a branch in which the first power switch S4 is located and the second sampling element M2 is connected in series to a branch in which the third power switch S6 is located.

When the controller in the control module determines that a sum of a current flowing through the first sampling element M1 and a current flowing through the second sampling element M2 is greater than the first threshold, the controller in the control module controls the second low-frequency switch S1 to be turned on.

Figure 15:
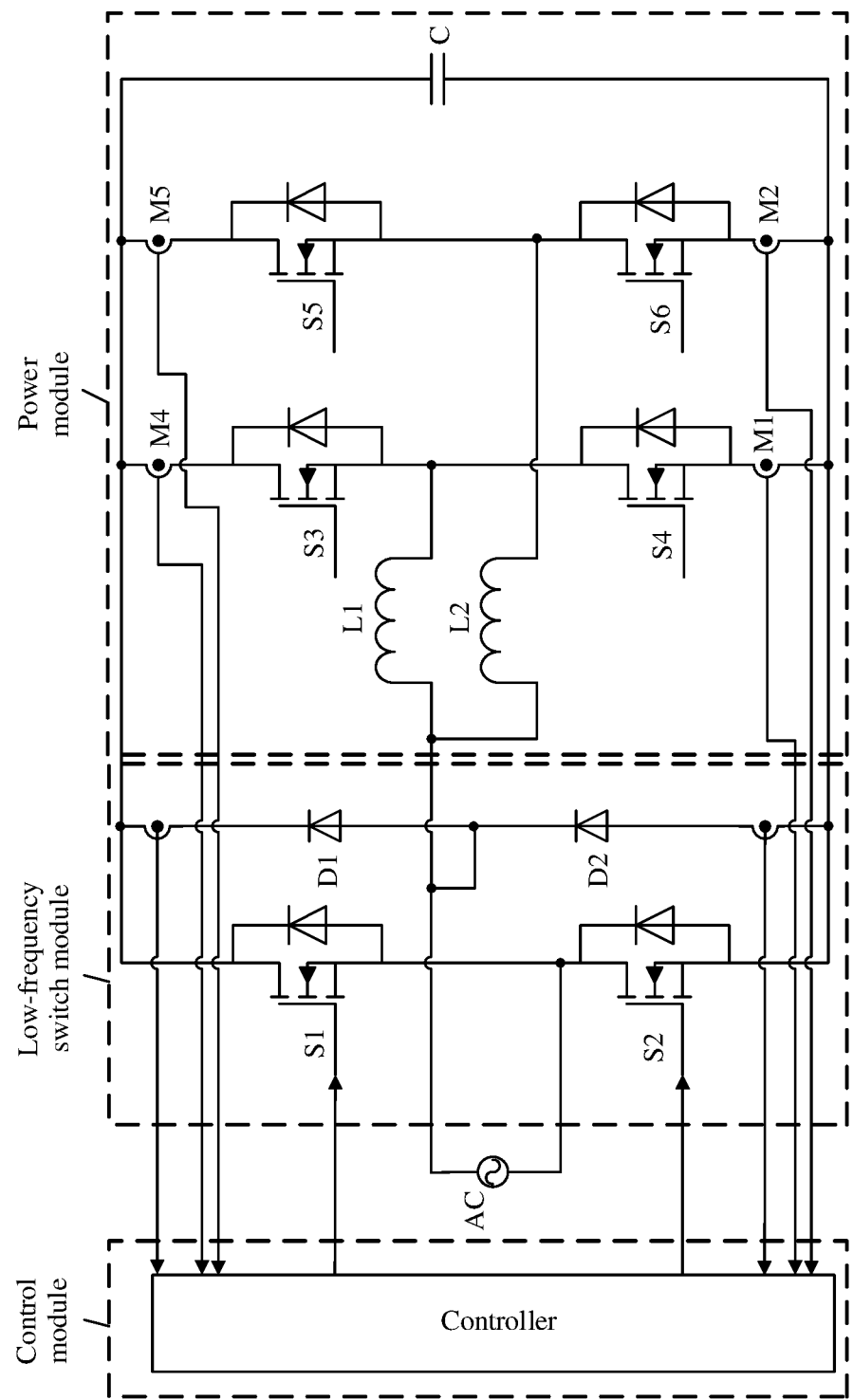
FIG. 15 is a schematic diagram of another embodiment of a bridgeless PFC circuit.

FIG. 15 is a schematic diagram of another embodiment of the bridgeless PFC circuit according to an embodiment.

In this embodiment, a possible implementation is shown in FIG. 15. Optionally, the current sampling element further includes a second sampling element M2, a fourth sampling element M4, and a fifth sampling element M5.

When the alternating current power supply works in a positive half-cycle, the first sampling element M1 is connected in series to a branch in which the first power switch S4 is located, the second sampling element M2 is connected in series to a branch in which the second power switch S3 is located, the fourth sampling element M4 is connected in series to a branch in which the third power switch S6 is located, and the fifth sampling element M5 is connected in series to a branch in which the fourth power switch S5 is located.

When the controller in the control module determines that a sum of a current flowing through the first sampling element M1, a current flowing through the second sampling element M2, a current flowing through the fourth sampling element M4, and a current flowing through the fifth sampling element M5 is greater than the first threshold, the control module controls the first low-frequency switch S2 to be turned on.

When the alternating current power supply works in a negative half-cycle, the first sampling element M1 is connected in series to a branch in which the first power switch S4 is located, the second sampling element M2 is connected in series to a branch in which the second power switch S3 is located, the fourth sampling element M4 is connected in series to a branch in which the third power switch S6 is located, and the fifth sampling element M5 is connected in series to a branch in which the fourth power switch S5 is located.

When the controller in the control module determines that a sum of a current flowing through the first sampling element M1, a current flowing through the second sampling element M2, a current flowing through the fourth sampling element M4, and a current flowing through the fifth sampling element M5 is greater than the first threshold, the control module controls the second low-frequency switch S1 to be turned on.

In the bridgeless PFC circuit provided in this embodiment, a control method for indirectly collecting a current of a low-frequency switching transistor is used. Therefore, a volume of the current sampling element is reduced, and zero-voltage turn-on and fast reverse overcurrent protection in any working condition are ensured. A low-frequency switch element is quickly turned on by collecting currents respectively and simultaneously flowing through a power switch element, an inductor, and a body diode of the low-frequency switch element. Because the current of the inductor cannot be changed abruptly, an ultra-low-delay requirement on a signal of a detection control circuit is lowered, thereby implementing zero-voltage turn-on in any working condition. A low-frequency switch element is quickly turned off by collecting currents respectively and simultaneously flowing through the first switch element and the first diode in the low-frequency switch module, thereby preventing the low-frequency switch element from being damaged due to an overcurrent. Zero-voltage turn-on and reverse overcurrent suppression of a low-frequency switch element of the bridgeless PFC circuit may be implemented, thereby improving reliability of the bridgeless PFC circuit.

What is claimed is:

1. A power factor correction (PFC) circuit, comprising:
   an alternating current power supply;
   a low-frequency switch module comprising a switch element;
   a power module comprising a first inductor; and
   a control module comprising a current sampling element, wherein the alternating current power supply is configured to be connected to the low-frequency switch module by using the switch element and connected to the power module by using the first inductor, the low-frequency switch module is configured to be connected to the power module by using the switch element, the control module is:
   configured to be connected to at least one of the power module and the low-frequency switch module by using the current sampling element
   configured to control the switch element comprised in the low-frequency switch module to be turned on or turned off
   configured to collects a current flowing through the current sampling element; and when the current flowing through the current sampling element is greater than a first threshold, configured to controls the switch element to be turned on or turned off.

2. The PFC circuit according to claim 1, wherein the switch element further comprises;
a first low-frequency switch and
a second low-frequency switch, the power module further comprises:
a first power switch,
a second power switch, and
a first capacitor, and the current sampling element further comprises:
a first sampling element, a first terminal of the alternating current power supply is configured to be connected to a first terminal of the first inductor, a second terminal of the alternating current power supply is configured to be connected to a first terminal of the first low-frequency switch and a first terminal of the second low-frequency switch, a second terminal of the first inductor is configured to be connected to a first terminal of the first power switch and a first terminal of the second power switch, a second terminal of the first low-frequency switch is configured to be connected to a second terminal of the first power switch, a second terminal of the second low-frequency switch is configured to be connected to a second terminal of the second power switch, the first capacitor is configured to be connected in parallel to a bridge arm branch comprising the first power switch and the second power switch, an input terminal of the control module is configured to be connected to the first sampling element, an output terminal of the control module is configured to be connected to a third terminal of the first low-frequency switch and a third terminal of the second low-frequency switch, and,
when the alternating current power supply is configured to be in different output states, the first sampling element is configured to be located in different locations.

3. The PFC circuit according to claim 2, wherein,
when the alternating current power supply is configured to works in a positive half-cycle and the first power switch is configured to be in an on state, the first sampling element is configured to be connected in series to a branch in which the first power switch is located, and
when a current flowing through the first sampling element is greater than the first threshold, the control module configured to be controls the first low-frequency switch to be turned on.

4. The PFC circuit according to claim 2, wherein,
when the alternating current power supply configured to works in a positive half-cycle and the first power switch is configured to be in an off state, the first sampling element is configured to be connected in series to a branch in which the second power switch is located, and
when a current flowing through the first sampling element is greater than the first threshold, the control module is configured to controls the first low-frequency switch to be turned on.

5. The PFC circuit according to claim 2, wherein,
when the alternating current power supply is configured to works in a negative half-cycle and the second power switch is configured to be in an on state, the first sampling element is configured to be connected in series to a branch in which the second power switch is located, and
when a current flowing through the first sampling element is greater than the first threshold, the control module is configured to controls the second low-frequency switch to be turned on.

6. The PFC circuit according to claim 2, wherein,
when the alternating current power supply is configured to works in a negative half-cycle and the second power switch is configured to be in an off state, the first sampling element is configured to be connected in series to a branch in which the first power switch is located, and
when a current flowing through the first sampling element is greater than the first threshold, the control module is configured to controls the second low-frequency switch to be turned on.

7. The PFC circuit according to claim 2, wherein the current sampling element further comprises:
a second sampling element, and
when the alternating current power supply is configured to works in a positive half-cycle, the first sampling element is configured to be connected in series to a branch in which the first power switch is located, and the second sampling element is configured to be connected in series to a branch in which the second power switch is located, and
when a sum of a current flowing through the first sampling element and a current flowing through the second sampling element is greater than the first threshold, the control module is configured to controls the first low-frequency switch to be turned on.

8. The PFC circuit according to claim 2, wherein the current sampling element further comprises:
a second sampling element, and
when the alternating current power supply is configured to works in a negative half-cycle, the first sampling element is configured to be connected in series to a branch in which the first power switch is located, and the second sampling element is configured to be connected in series to a branch in which the second power switch is located, and
when a sum of a current flowing through the first sampling element and a current flowing through the second sampling element is greater than the first threshold, the control module is configured to controls the second low-frequency switch to be turned on.

9. The PFC circuit according to claim 2, wherein the low-frequency switch module further comprises:
a first diode; and
a second diode; a negative electrode of the first diode is configured to be connected to the first terminal of the alternating current power supply and a positive electrode of the second diode, and a positive electrode of the first diode is configured to be connected to the second terminal of the first low-frequency switch and the second terminal of the first power switch, the positive electrode of the second diode is configured to be connected to the first terminal of the alternating current power supply, and a negative electrode of the second diode is configured to be connected to the second terminal of the second low-frequency switch and the second terminal of the second power switch, the control module is configured to collects a current of a third sampling element, the current flowing through the third sampling element is a current flowing through the first diode or the second diode, and
when the current flowing through the third sampling element is greater than the first threshold, the control module is configured to controls the first low-frequency switch or the second low-frequency switch to be turned off.

10. The PFC circuit according to claim 9, wherein
when the alternating current power supply is configured to works in a positive half-cycle and the first low-frequency switch is in an on state, the third sampling element is configured to be connected in series to a branch in which the first diode is located or the third sampling element is configured to be connected in series to a branch between the first terminal of the alternating current power supply and a first connection point, and the first connection point is a connection point between the first diode and the second diode, and
when the current flowing through the third sampling element is greater than the first threshold, the control module is configured to controls the first low-frequency switch to be turned off.

11. The PFC circuit according to claim 9, wherein
when the alternating current power supply is configured to works in a negative half-cycle and the second low-frequency switch is in an on state, the third sampling element is configured to be connected in series to a branch in which the second diode is located or the third sampling element is configured to be connected to a branch between the first terminal of the alternating current power supply and a first connection point, and the first connection point is a connection point between the first diode and the second diode, and
when the current flowing through the third sampling element is greater than the first threshold, the control module is configured to controls the second low-frequency switch to be turned off.

12. The PFC circuit according to claim 9, wherein
when the alternating current power supply is configured to works in a positive half-cycle and the first low-frequency switch is configured to be in an on state, the third sampling element is configured to be connected in series between a second connection point and a third connection point, the second connection point is a connection point between the first diode and the first power switch, the third connection point is a connection point between the first low-frequency switch and the first capacitor, and the third sampling element is the same as the first sampling element, and
when the current flowing through the third sampling element is greater than the first threshold, the control module is configured to controls the first low-frequency switch to be turned off.

13. The PFC circuit according to claim 9, wherein
when the alternating current power supply is configured to works in a negative half-cycle and the second low-frequency switch is configured to be in an on state, the third sampling element is configured to be connected in series between a fourth connection point and a fifth connection point, the fourth connection point is a connection point between the second diode and the second power switch, the fifth connection point is a connection point between the second low-frequency switch and the first capacitor, and the third sampling element is the same as the first sampling element, and
when the current flowing through the third sampling element is greater than the first threshold, the control module is configured to controls the second low-frequency switch to be turned off.

14. The PFC circuit according to claim 2, wherein the power module further comprises:

a second inductor,
a third power switch, and
a fourth power switch, a first terminal of the second inductor is configured to be connected to the first terminal of the alternating current power supply, and a second terminal of the second inductor is configured to be connected to a first terminal of the third power switch, the first capacitor is configured to be connected in parallel to a bridge arm branch comprising the third power switch and the fourth power switch, a second terminal of the third power switch is configured to be connected to the second terminal of the first power switch, a first terminal of the fourth power switch is configured to be connected to the first terminal of the second power switch, and a second terminal of the fourth power switch is configured to be connected to the first terminal of the third power switch.

15. The PFC circuit according to claim 14, wherein the current sampling element further comprises:
a second sampling element,
when the alternating current power supply is configured to works in a positive half-cycle, the first sampling element is configured to be connected in series to a branch in which the first power switch is located and the second sampling element is configured to be connected in series to a branch in which the third power switch is located, or
the first sampling element is configured to be connected in series to a branch in which the second power switch is located and the second sampling element is configured to be connected in series to a branch in which the fourth power switch is located, and
when a sum of a current flowing through the first sampling element and a current flowing through the second sampling element is greater than the first threshold, the control module is configured to controls the first low-frequency switch to be turned on.

16. The PFC circuit according to claim 14, wherein the current sampling element further comprises:
a second sampling element,
when the alternating current power supply is configured to works in a negative half-cycle, the first sampling element is configured to be connected in series to a branch in which the second power switch is located and the second sampling element is configured to be connected in series to a branch in which the fourth power switch is located, or
the first sampling element is configured to be connected in series to a branch in which the first power switch is located and the second sampling element is configured to be connected in series to a branch in which the third power switch is located, and
when a sum of a current flowing through the first sampling element and a current flowing through the second sampling element is greater than the first threshold, the control module is configured to controls the second low-frequency switch to be turned on.

17. The PFC circuit according to claim 14, wherein the current sampling element further comprises:
a second sampling element,
a fourth sampling element, and
a fifth sampling element,
when the alternating current power supply is configured to works in a positive half-cycle, the first sampling element is configured to be connected in series to a branch in which the first power switch is located, the second sampling element is configured to be connected in series to a branch in which the second power switch is located, the fourth sampling element is configured to be connected in series to a branch in which the third power switch is located, and the fifth sampling element is configured to be connected in series to a branch in which the fourth power switch is located, and when a sum of a current flowing through the first sampling element, a current flowing through the second sampling element, a current flowing through the fourth sampling element, and a current flowing through the fifth sampling element is greater than the first threshold, the control module is configured to controls the first low-frequency switch to be turned on.

18. The PFC circuit according to claim 14, wherein the current sampling element further comprises:
a second sampling element,
a fourth sampling element, and
a fifth sampling element,
when the alternating current power supply is configured to works in a negative half-cycle, the first sampling element is configured to be connected in series to a branch in which the first power switch is located, the second sampling element is configured to be connected in series to a branch in which the second power switch is located, the fourth sampling element is configured to be connected in series to a branch in which the third power switch is located, and the fifth sampling element is configured to be connected in series to a branch in which the fourth power switch is located, and when a sum of a current flowing through the first sampling element, a current flowing through the second sampling element, a current flowing through the fourth sampling element, and a current flowing through the fifth sampling element is greater than the first threshold, the control module is configured to controls the second low-frequency switch to be turned on.

19. A communication power supply, wherein the communication power supply comprises a power factor correction (PFC) circuit, comprising:
an alternating current power supply;
a low-frequency switch module comprising a switch element;
a power module comprising a first inductor; and
a control module comprising a current sampling element, wherein the alternating current power supply is configured to be connected to the low-frequency switch module by using the switch element and connected to the power module by using the first inductor, the low-frequency switch module is configured to be connected to the power module by using the switch element, the control module is;

configured to be connected to at least one of the power module and the low-frequency switch module by using the current sampling element, configured to controls the switch element comprised in the low-frequency switch module to be turned on or turned off, configured to collects a current flowing through the current sampling element; and when the current flowing through the current sampling element is greater than a first threshold, configured to controls the switch element to be turned on or turned off.

20. The communication power supply according to claim 19, wherein the switch element further comprises:
a first low-frequency switch, and
a second low-frequency switch, the power module further comprises:
a first power switch,
a second power switch, and
a first capacitor, and the current sampling element further comprises:
a first sampling element, a first terminal of the alternating current power supply is configured to be connected to a first terminal of the first inductor, a second terminal of the alternating current power supply is configured to be connected to a first terminal of the first low-frequency switch and a first terminal of the second low-frequency switch, a second terminal of the first inductor is configured to be connected to a first terminal of the first power switch and a first terminal of the second power switch, a second terminal of the first low-frequency switch is configured to be connected to a second terminal of the first power switch, a second terminal of the second low-frequency switch is configured to be connected to a second terminal of the second power switch, the first capacitor is configured to be connected in parallel to a bridge arm branch comprising the first power switch and the second power switch, an input terminal of the control module is configured to be connected to the first sampling element, an output terminal of the control module is configured to be connected to a third terminal of the first low-frequency switch and a third terminal of the second low-frequency switch, and when the alternating current power supply is configured to be in different output states, the first sampling element is configured to be located in different locations.

* * * * *